Patented Mar. 20, 1945

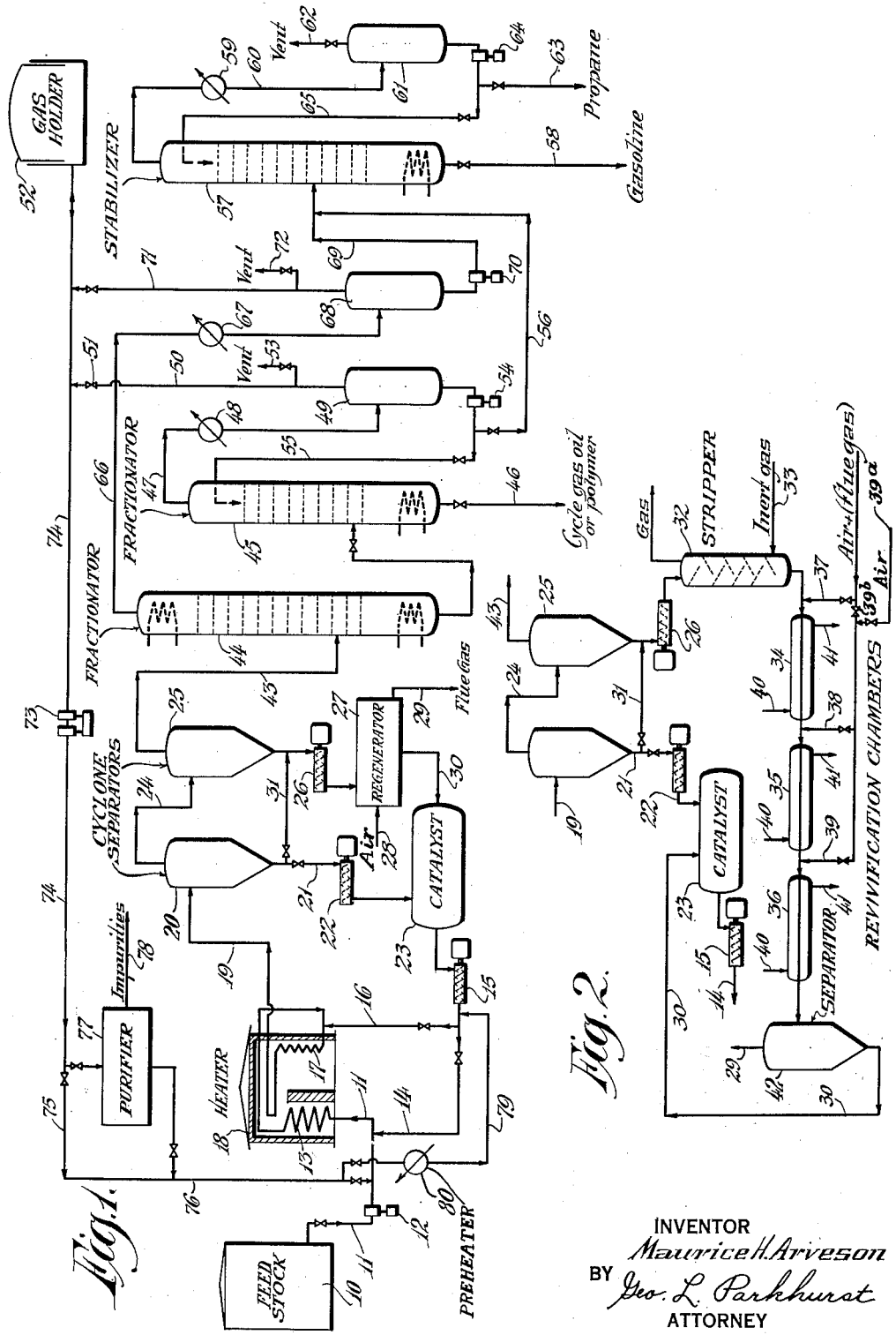

2,372,165

UNITED STATES PATENT OFFICE 2,372,165

CATALYTIC CONVERSION

Maurice H. Arveson, Flossmoor, Ill., assignor to Standard Oil Company, Chicago, Ill., a corporation of Indiana Application September 13, 1939, Serial No. 294,772

3 Claims. (Cl. 196—50)

This invention relates to processes for the catalytic conversion of hydrocarbon oils and particularly to a new method for catalytically converting such materials in the presence of hydrogen using certain new types of catalysts which are suspended in the vapors undergoing conversion.

A type of catalytic conversion process which has recently gained prominence involves the vapor phase catalytic cracking of hydrocarbon stocks substantially heavier than gasoline to produce gasoline. Catalytic cracking processes of this type are carried on in the vapor phase at elevated temperatures by the use of catalysts of which a catalyst comprising alumina on a silica support is typical.

Another type of process which is gaining increasing attention involves the reforming, decreasing or aromatization of naphtha hydrogenation or aromatization of naphtha boiling within and/or slightly above the gasoline boiling point range to produce gasolines of improved octane number.

However, the catalytic cracking type of process is not satisfactory on light stocks since it produces an undue amount of the less valuable lighter hydrocarbons while catalytic reforming or dehydrogention is not readily applicable to stocks substantially heavier than gasoline since in such cases the gasoline yield is very low.

It is an object of my invention to provide a process which is applicable to a wide range of charging stocks and which will give at one and the same time desirable conversion of both the lighter and the heavier portions of a given charging stock. A further object of my invention is to provide a catalytic conversion process which is applicable to a charging stock of wide boiling range. A still further object of my invention is to provide a particularly advantageous process of the type in which a catalyst is suspended in the vapors undergoing conversion. Still another object of my invention is to provide a catalytic conversion process of the powdered catalyst type in which the catalyst is used with maximum efficiency. It is also an object of my invention to produce good yields of high antiknock gasoline and, at the same time, a valuable cycle stock. Other and more detailed objects, advantages and uses of my invention will become apparent as the description thereof proceeds.

As previously mentioned, the preferred catalyst is a mixture of two catalysts, one of which is primarily a cracking catalyst and the other of which is a catalyst for reactions known variously as reforming, dehydrogenation, cyclization, aromatization and dehydro-aromatization reactions. For purposes of convenience I will refer to these latter types of reactions under the name of dehydrogenation reactions since all of the various processes referred to involve dehydrogenation. Thus, briefly, one of the catalysts is a cracking catalyst which is adapted to accomplish the scission of carbon to carbon bonds while the second is a dehydrogenation catalyst, the action of which is reasonably specific to the scission of carbon to hydrogen bonds.

The cracking catalyst used in my invention can be any catalyst which acts on carbon to carbon bonds to make molecules of smaller skeleton. Natural clays, particularly acid-treated clays, are excellent for this purpose, and one such clay which gives particularly good results is known as Super Filtrol. This material, like other naturally occurring clays and more particularly acid-treated clays, is primarily composed of aluminum oxide and silicon oxide, although other oxides are usually present to a greater or lesser extent. Synthetic materials of somewhat similar chemical constitution are often preferable to the natural argillaceous materials and one such synthetic material which gives excellent results is composed of aluminum oxide deposited on silica. The silica is preferably in the form of a gel and the aluminum oxide can be adsorbed on the gel by digesting the latter in a solution of an aluminum salt followed by filtration, washing and drying. Instead of depositing $Al_2O_3$ on the silica, oxides of a great many other metals (in fact practically any polyvalent metal) can be used although the efficiency of the catalyst will depend very markedly on the metal selected. Amongst the metals whose oxides deposited on silica give particularly good results as cracking catalysts are thorium, cerium, cadmium, zirconium, copper, titanium, nickel, manganese and uranium. More than one metallic oxide can, of course, be deposited on the silica support.

Turning to the dehydrogenation catalyst used in my invention, I find that the metals or preferably the oxides of metals from the left hand columns of groups IV, V, and VI of the periodic table are particularly effective. Sulfides of these same metals can also be used but are definitely less desirable. Particularly good results are given by the oxides of chromium and molybdenum. While these oxides of metals from the left hand columns of groups IV, V and VI or the corresponding metals themselves can be used alone or on any desired supporting material, it is particularly efficacious to use them supported on alumina. Any form of alumina can be used but activated alumina gives particularly good results and alumina gel gives in general still better results. Thus a dehydrogenation catalyst can be made by digesting an alumina gel in a solution of a molybdenum salt followed by filtration, washing and drying at an elevated temperature.

Both in the case of the cracking catalyst and in the case of the dehydrogenation catalyst, the oxide or oxides adsorbed on the silica support in the first case or on the alumina support in the second case can be present in various amounts depending upon the particular material used, but in general the active oxide or oxides (or the metal or metals) should be from 1 to 30% by weight of the total catalyst including the support.

In my invention a cracking catalyst and a dehydrogenation catalyst are used in admixture with each other and the stock to be cracked is contacted with the mixture of the two catalysts. This stock preferably includes a substantial amount of material boiling within the gasoline boiling point range, for instance, between 300 and 400° F. and also a substantial amount of material boiling well above the gasoline range, for instance from 500 to 600° F. Materials boiling between 400 and 500° F. are normally also present and materials boiling below 300° F. and/or above 600° F. may also be present. A great variety of hydrocarbon charging stocks can be used. The mixed catalyst attacks a wide boiling charging stock by breaking down the heavier components into lighter ones by virtue of the cracking properties of the catalyst, while the dehydrogenating properties of the catalyst result in rearranging the lighter constituents in the stock as well as lighter constituents produced by the cracking catalyst into molecules of greatly improved antiknock value, due to reactions involving dehydrogenation, cyclization, aromatization, etc. Thus the mixed catalysts accomplish results which neither component can accomplish alone, and make it possible to charge a wider boiling stock or a greater variety of stocks than would otherwise be possible.

These mixed catalysts can be used in a stationary type of catalyst bed or in a moving granular type of catalyst bed, processes of these types being known to the art when using other catalysts. However, I greatly prefer to use my mixed catalysts in the form of mixed powders suspended in the stream of hydrocarbon vapors undergoing conversion. Also, regardless of the form of the catalyst and the type of reactor, I greatly prefer to carry out my process using my two mixed catalysts in the presence of added hydrogen and this is particularly true when the catalysts are used in powdered form, and when the feed contains substantial amounts of hydrocarbons boiling in the gasoline boiling point range.

As an example of the process steps in which these mixed catalysts can be utilized I refer to the accompanying drawing which illustrates one embodiment of my invention. In this drawing Figure 1 is a simplified flow diagram illustrating a process in accordance with my invention and Figure 2 is a simplified flow diagram showing one type of regeneration system which can be used in the practice of my invention.

Turning now to Figure 1 a petroleum or other hydrocarbon charging stock, for instance a gas oil, a heavy naphtha, or a mixture of the two, preferably a virgin stock having a wide boiling point range extending both into the gasoline boiling point range and into the gas oil boiling point range, is pumped from feed tank 10 through valved line 11 by means of pump 12. The mixed catalysts can be injected in a slurry form into the charge going to coil 13 by means of valved line 14 and pump 15. However, it is preferred to vaporize the charge in coil 13 before injecting the catalyst, and in this preferred operation the mixed powdered catalysts are injected into the vapor stream by means of valved line 16. If slurry catalysts are used, the liquid in which the catalyst is suspended (for instance a portion of the charge) is vaporized by the time it passes through coil 13, and thus with either slurry injection or powder injection the catalysts pass through coil 17 in powdered form suspended in the vapors to be converted.

Coil 13 can be arranged in a cooler portion of furnace 18 and coil 17 in the radiant section as shown.

The conversion products along with the catalysts pass through transfer line 19 to separator 20, which may suitably be of the cyclone type, where a large portion, for instance 80 to 98% of the catalyst, is separated out and recycled via line 21, pump 22 and catalyst storage and handling chamber 23. By recycling a part, preferably a large part, of the catalyst the size of the regeneration system and the expense of regeneration is greatly reduced, and it is possible to increase very markedly the economically usable ratio of catalyst to oil. Thus, for instance, the catalyst to oil ratio on a weight basis, without recycling of catalyst, can be from 0.1:1 or preferably 1:1 to 2.5:1, while when catalyst is recycled the total catalyst to oil ratio can be much larger than the catalyst to oil ratio when recycling is not used and may be as high as 20:1. This total catalyst to oil ratio is the total weight of catalysts (fresh, recycled, regenerated) charged to the contacting step in unit time divided by the weight of total charging stock charged to the contacting step in the same time.

My combination of a large proportion of catalyst recycled without regeneration and a very high total catalyst to oil ratio, for instance from 5:1 to 20:1, is particularly advantageous when the amount of dehydrogenation catalyst in my mixed catalysts is high, for instance from 70 to 90% by weight of the total catalyst, and it is also very definitely advantageous when the catalyst contains only the dehydrogenation component without any cracking component at all.

Returning to Figure 1, the vapors from separator 20 carrying a minor part of the catalyst pass through line 24 to a second separator 25 in which substantially all of the remainder of the catalyst is separated out, steamed to remove adsorbed hydrocarbons (by means not shown) and passed by pump 26 to catalyst regeneration system 27 which can be of any desired type and in which the catalyst can be regenerated by treatment with hydrogen at high temperatures and pressures or with solvents or by any other means but preferably by blowing with air or other oxygen-containing gas, to remove carbonaceous deposits. This air can be injected through line 28 and the resulting flue gas can be withdrawn through line 29. The regenerated catalyst is conveyed through line 30 to catalyst storage and handling chamber 23.

Further adjustment of the relative amounts of catalysts recycled with and without regeneration can be accomplished by means of valved line 31.

Turning to Figure 2 I have illustrated one possible form of regeneration system in more detail. The catalyst from separator 25 passes through stripper 32 where it is stripped with an inert gas introduced through line 33, and then through a series of elongated revivification chambers 34, 35 and 36. Air diluted with flue gas enters the first revivification chamber 34 through valved line 37 along with the catalysts and additional air and flue gas can be injected by valved lines 38 and 39 into the subsequent revivification chambers 35 and 36, or air alone can be introduced into the latter chambers by the use of valved line 39a, valve 39b being closed, in order to accomplish complete oxidation of the carbonaceous material without overheating the catalyst in the first revivification chamber 34. Chambers 34, 35 and 36 can be cooled by a cooling medium introduced through line 40 and removed through lines 41 to prevent overheating the catalysts during revivification. The revivified or regenerated catalysts along with the gases pass to separator 42 which may be of the cyclone type and the gases are discarded through flue 29. The catalyst is then conveyed through line 30 to catalyst storage and handling chamber 23.

It may be well to mention at this point that the diagrammatic showing of Figures 1 and 2 omits many features which those skilled in the art would recognize as desirable or essential in actual plant operation. These omissions are made in order to simplify the presentation of the invention and to avoid encumbering it with well understood engineering details. Thus, for example, catalyst conveying and handling systems are not shown in detail, gas locks between the conversion system and the regeneration system are not provided and various desirable flow control, pumping, heat exchange and safety equipment is omitted from the diagrammatic representation.

Reverting now to Figure 1 conversion products pass from separator 25 through line 43 to fractionator 44. In this fractionator, which is preferably operated under rather high pressure, a rough separation between gasoline and gas is made. The liquid from this fractionating column is passed to a second fractionator 45 where material boiling above the gasoline boiling point range is separated as a bottoms and withdrawn through valved line 46. This material which may be called cycle gas oil or polymer can be recycled with the feed or, preferably, withdrawn from the system for thermal conversion or other use. The gasoline product is taken overhead from fractionator 45 through line 47 and condenser 48 to separator 49 from which gas passes through line 50 and valve 51 to gas holder 52 or is recycled to the conversion step. Alternatively all or part of this gas can be removed from the system through valved vent line 53.

The gasoline in separator 49 is divided into two streams, part being recycled to fractionator 45 by means of pump 54 and valved line 55 as reflux and the remainder being pumped by pump 54 through valved line 56 to stabilizer 57, from the bottom of which the high octane number gasoline product is withdrawn through valved line 58. The light hydrocarbon gases from stabilizer 57 pass through condenser 59 and line 60 to separator 61 from which fixed gases are removed from the system through valved line 62, while the condensables are in part removed through valved line 63 and in part recycled as reflux to stabilizer 57 by means of pump 64 and valved line 65.

I have described how the liquid fraction from fractionator 44 is carried through to the finished gasoline. However, since this first fractionator makes only a rough separation between gas and gasoline, the overhead which is removed through line 66 and condenser 67 contains considerable gasoline as well as other condensables, and these are separated from gas in separator 68 and sent to stabilizer 57 through line 69 by pump 70. The gases from this separator which are very rich in hydrogen pass through valved line 71 for recycling. Gas holder 52 floats on the recycle line. However, since my process produces hydrogen rather than consuming it, a portion of this gas must be removed from the system through valved line 72 when the capacity of the gas holder is exceeded.

Hydrogen is added to the feed by means of compressor 73 in line 74. This hydrogen (being that produced by the process) inevitably contains considerable amounts of methane and other light hydrocarbons as well as other impurities. While this impure hydrogen can be sent directly into the conversion coil 13 via line 74, valved by-pass line 75 and line 76, it can alternatively be sent, in whole or in part, through a purification system 77 (shown diagrammatically) from which impurities are removed via line 78. This purification system may involve absorption, gas cracking, and/or other steps, but does not constitute an important feature of the present invention and will therefore not be described in detail.

Movement of catalyst in lines 14 and/or 16 can be aided by introduction of gas from line 76 through valved line 79 to the discharge line from pump 15. This gas may be, and preferably is, preheated by preheater 80 which may be a coil in furnace 18 or in a separate furnace. If desired all hydrogen-containing gas may be introduced by this route.

By thus converting the charging stock in the presence of added hydrogen, much larger yields of the valuable aromatic hydrocarbons can be obtained and the catalyst does not deteriorate as readily or require regeneration as often as it otherwise would. However, in my powdered catalyst process the added hydrogen has another very important advantage; namely, it increases the vapor volume and vapor velocity to a point which permits much higher ratios of catalyst to charge than would otherwise be possible, and thus gives greatly improved catalyst efficiency.

The temperature in coil 17 where the bulk of the conversion takes place can suitably be between 850 and 1025° F., for instance 950° F. The charge can be preheated in coil 13 to about reaction temperature.

My process can be operated at atmospheric pressure or at a slightly elevated pressure, for instance from 30 to 450 pounds per square inch. Pressures of 100 to 200 pounds per square inch are suitable.

As previously pointed out, I find it highly desirable to use an extremely large amount of catalyst, particularly when the catalyst is rich in, or confined to, the dehydrogenation component. Thus, for instance, excellent results are obtained by suspending in the hydrocarbon vapors mixed with hydrogen an amount of powdered catalyst equal to from about 1 to about 20 and preferably from about 5 to about 20 times the weight of charging stock present in the mixed vapors in which the catalyst is suspended. Having chosen a ratio of catalyst to oil, I then find it highly desirable to use a contacting zone of such size as to give a space velocity of from 0.1 to 3 volumes of charging stock (measured as liquid) passing through the contacting zone per hour per apparent volume of catalyst present in this contacting zone. By apparent volume of the catalyst I refer to the gross space which would be occupied by the catalyst if the catalyst particles were at rest in contact with each other as they are in a fixed bed. This preferred space velocity of from 0.1 to 3 volumes per volume per hour is applicable not only to my preferred powdered catalyst technique but also to fixed bed and moving granular bed work. As an example a space velocity of 1.4 is suitable.

Recycle gas rich in hydrogen can be used in amounts ranging from 0.5 to 10 mols per mol of charge. This mol ratio is roughly the same as the ratio by volume of recycled gas to vaporized charge, both being measured at the same temperature. The mol ratio or vapor ratio may, for instance, be 2.

As previously pointed out, the mixed catalysts are preferably made up of a cracking component and a dehydrogenation component which are intimately mixed but are in the form of separate particles. The ratio of the two components can be varied over wide limits but I prefer to use at least 10% by weight of each component. However, as described, some novel features of my process are applicable to the use of a dehydrogenation catalyst without any cracking component at all.

Other types of mixed catalysts, preferably mixed powdered catalysts, which can be used in the type of process I have described are catalysts in which one component is an aluminum oxide gel and the other component is an oxide of a metal selected from the left-hand columns of groups IV, V and VI of the periodic table. This second oxide may be present in any desired form, for instance as particles of gel, or it may be supported on an aluminum oxide gel. Thus one component can be an aluminum oxide gel and the other component can be an aluminum oxide gel on which molybdenum or chromium or molybdenum or chromium oxide is supported.

The particles in the mixed powdered catalysts are prepared by making each component separately and reducing it to the dry condition either before or after final grinding or pulverization to the desired mesh. The two materials can undergo the final grinding in a single operation or separately and are then screened to the desired mesh which may vary over relatively wide limits, for instance 100–500 mesh, but may typically be 300 mesh, when that form of my process is used in which the powdered catalyst is injected into the vapor stream prior to conversion.

Having described my invention in connection with certain specific embodiments thereof, I wish it to be understood that these are by way of example rather than by way of limitation and that I do not intend to be restricted thereby but only to the scope of the appended claims.

I claim:

1. A process for the conversion of a normally liquid hydrocarbon charging stock including relatively light and relatively heavy constituents into a fraction predominating in hyrocarbons boiling within the gasoline range which comprises vaporizing the charging stock, suspending a large amount of a mixture of discrete particles of a powdered cracking catalyst comprising a catalytic oxide supported on silica and of a powdered dehydrogenation catalyst comprising a catalytic oxide supported on alumina in the charging stock vapors, contacting said charging stock vapors and suspended mixture of catalysts at an elevated temperature in the presence of hydrogen whereby the relatively light constituents within said contacting zone are rearranged to produce predominantly gasoline hydrocarbons, separating the mixed catalysts and reaction products, regenerating a small controlled proportion of the separated mixed catalyst, recovering a hydrogen-containing gas from said reaction products, withdrawing a portion of said hydrogen-containing gas from the system, introducing all of the catalyst into a stream of preheated recycled hydrogen-containing gas, injecting said last-mentioned stream into said charging stock vapors, and thereby resuspending the mixed catalyst in charging stock vapors.

2. A process for producing motor fuel from a wide boiling hydrocarbon oil containing a substantial amount of material boiling within 300 and 400° F. and a substantial amount of material boiling between 500 and 600° F. to produce antiknock gasoline, comprising the steps of contacting said stock at an elevated temperature with a mixture of separate particles of a cracking catalyst comprising a catalytic oxide supported on silica and separate particles of a dehydrogenation catalyst comprising a catalytic oxide supported on alumina, said contacting being effected by suspending the catalyst mixture in a gaseous mixture comprising the hydrocarbon undergoing treatment and added hydrogen whereby the vapor volume and vapor velocity within the reaction zone are of such magnitude as to maintain high ratios of catalyst mixture to hydrocarbon, effecting cracking of the heavier constituents and rearrangement of the lighter constituents, separating the catalyst and reaction fluids, and recovering a high octane number fuel.

3. A process for producing motor fuel from a wide-boiling hydrocarbon oil containing substantial amounts of material boiling between about 300 and about 400° F. and a substantial amount of material boiling between about 500 and about 600° F. which comprises contacting the wide boiling hydrocarbon stock including the mixture of relatively low boiling and relatively high boiling hydrocarbons in the vapor phase at an elevated temperature in the presence of added hydrogen with a mixed powdered catalyst comprising separate particles of a catalytic polyvalent metal oxide supported on silica and separate particles of a second catalytic polyvalent metal oxide supported on alumina, said contacting in the presence of hydrogen being effected by suspending a high proportion of the catalyst mixture in the hydrocarbon vapors whereby the relatively high boiling constituents are cracked to produce hydrocarbons boiling within the gasoline range, and effecting rearrangement of both the relatively low boiling charging stock and the hydrocarbons boiling within the gasoline range resulting from the cracking of the relatively high boiling constituents of the charging stock to produce increased quantities of high octane number hydrocarbons boiling predominantly within the gasoline range.

MAURICE H. ARVESON.